United States Patent
Gremse et al.

(10) Patent No.: US 9,134,540 B2
(45) Date of Patent: Sep. 15, 2015

(54) THREE DIMENSIONAL DISPLAY SYSTEM

(75) Inventors: Felix Gremse, Limbourg (BE); Vasanth Philomin, Stolberg (DE); Maarten Tobias, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 688 days.

(21) Appl. No.: 13/125,064

(22) PCT Filed: Oct. 26, 2009

(86) PCT No.: PCT/IB2009/054713
§ 371 (c)(1),
(2), (4) Date: Apr. 20, 2011

(87) PCT Pub. No.: WO2010/049868
PCT Pub. Date: May 6, 2010

(65) Prior Publication Data
US 2011/0193863 A1    Aug. 11, 2011

(30) Foreign Application Priority Data

Oct. 28, 2008 (EP) .................................. 08167683

(51) Int. Cl.
*G06T 15/00* (2011.01)
*G02B 27/22* (2006.01)
(Continued)

(52) U.S. Cl.
CPC .......... *G02B 27/225* (2013.01); *H04N 13/0404* (2013.01); *H04N 13/047* (2013.01);
(Continued)

(58) Field of Classification Search
CPC ......... G06T 19/00; G06T 17/20; G06T 17/00; G06T 15/10; G06T 15/00
USPC .................... 345/419, 178, 173, 543, 87, 694; 348/51, 52, 53, 54, 55, 56; 715/700, 715/764, 866, 210
See application file for complete search history.

(56) References Cited

U.S. PATENT DOCUMENTS 5,493,427 A * 2/1996 Nomura et al. ..................... 349/5
5,872,590 A * 2/1999 Aritake et al. .................. 348/57
(Continued)

FOREIGN PATENT DOCUMENTS

CN    1557083 A    12/2004
EP    0935154 A2    8/1999
(Continued)

OTHER PUBLICATIONS

Fehn et al: "Interactive 3-DTV-Concepts and Key Technologies"; Proceeding of the IEEE, vol. 94, No. 3, Mar. 2006, pp. 524-538.
(Continued)

*Primary Examiner* — Abderrahim Merouan (57) ABSTRACT

A three dimensional display system comprises a display (207) presenting a plurality of views of a scene where each view corresponds to a viewing direction for the scene. A rendering unit (203) generates an image for each of the views. The rendering unit (203) is capable of generating differentiated images for neighboring views containing differentiated image data providing a three dimensional depth effect when neighboring views are viewed by different eyes of a viewer. A user processor (209) generates a user presence estimate in response to an attempted detection of a user in a viewing area for the display system. A 3D mode controller (213) modifies the three dimensional effect in response to the user presence estimate. For example, the display system may provide a two dimensional image when no user is present and a three dimensional image when a user is present. This may reduce discomfort experienced by viewers in suboptimal positions.

18 Claims, 3 Drawing Sheets

(51) Int. Cl.
*H04N 13/04* (2006.01)
*G06T 17/00* (2006.01)
*G06T 19/00* (2011.01)
*G06T 17/20* (2006.01)
*G06T 15/10* (2011.01)

(52) U.S. Cl.
CPC ....... *H04N13/0409* (2013.01); *H04N 13/0447* (2013.01); *H04N 13/0454* (2013.01); *H04N 13/0475* (2013.01); *G06T 15/00* (2013.01); *G06T 15/10* (2013.01); *G06T 17/00* (2013.01); *G06T 17/20* (2013.01); *G06T 19/00* (2013.01)

(56) References Cited

U.S. PATENT DOCUMENTS

| | | | | |
|---|---|---|---|---|
| 5,905,593 | A * | 5/1999 | Lo et al. | 359/463 |
| 6,108,029 | A * | 8/2000 | Lo | 348/43 |
| 6,204,876 | B1 * | 3/2001 | Uomori et al. | 348/47 |
| 6,324,001 | B2 * | 11/2001 | Tabata | 359/462 |
| 6,445,009 | B1 * | 9/2002 | Grandjean et al. | 257/85 |
| 6,614,927 | B1 * | 9/2003 | Tabata | 382/154 |
| 6,646,623 | B1 * | 11/2003 | Chakrabarti | 345/6 |
| 6,996,267 | B2 * | 2/2006 | Tabata | 382/154 |
| 7,298,552 | B2 * | 11/2007 | Redert | 359/463 |
| 7,570,385 | B2 * | 8/2009 | Okutsu et al. | 358/1.18 |
| 8,208,011 | B2 * | 6/2012 | De Zwart et al. | 348/51 |
| 8,368,745 | B2 * | 2/2013 | Nam et al. | 348/59 |
| 8,537,206 | B2 * | 9/2013 | Son et al. | 348/53 |
| 2001/0000025 | A1 * | 3/2001 | Darrell et al. | 382/103 |
| 2003/0007204 | A1 * | 1/2003 | Ashizaki et al. | 359/23 |
| 2003/0052911 | A1 | 3/2003 | Cohen-Solal | |
| 2005/0057807 | A1 * | 3/2005 | Takagi et al. | 359/462 |
| 2006/0139448 | A1 * | 6/2006 | Ha et al. | 348/51 |
| 2006/0170764 | A1 * | 8/2006 | Hentschke | 348/42 |
| 2008/0204548 | A1 * | 8/2008 | Goulanian et al. | 348/51 |
| 2008/0225114 | A1 * | 9/2008 | De Zwart et al. | 348/51 |
| 2008/0278640 | A1 * | 11/2008 | Ijzerman et al. | 349/15 |
| 2009/0129630 | A1 * | 5/2009 | Gloudemans et al. | 382/103 |
| 2009/0309873 | A1 | 12/2009 | Saishu et al. | |
| 2010/0073467 | A1 * | 3/2010 | Nam et al. | 348/59 |
| 2010/0303442 | A1 * | 12/2010 | Newton et al. | 386/241 |

FOREIGN PATENT DOCUMENTS

| | | |
|---|---|---|
| JP | H11164328 A | 6/1999 |
| JP | 2003135753 A | 5/2003 |
| JP | 2005167445 A | 6/2005 |
| JP | 2006268630 A | 10/2006 |
| JP | 2008067092 A | 3/2008 |
| JP | 2008185629 A | 8/2008 |
| WO | 9944091 A1 | 9/1999 |
| WO | 2004088348 A1 | 10/2004 |
| WO | WO-2007/020600 A2 * | 2/2007 |

OTHER PUBLICATIONS

Fehn, C.: "Depth-Image Bassed Rendering (DIBR), Compression and Transmission for a New Approach on 3D-TV"; Stereoscopic Displays and Virtual Reality Systems X1, Proceedings of the SPIE, vol. 5291, May 2004, pp. 93-104.

Shade et al, "Layered Depth Images", Comoputer Graphics Proceedings, Annual Conference Series, SIGGRAPH 98, pp. 231-242.

* cited by examiner

THREE DIMENSIONAL DISPLAY SYSTEM

FIELD OF THE INVENTION

The invention relates to a three dimensional display system and a method of operating therefor.

BACKGROUND OF THE INVENTION

Three dimensional displays are receiving increasing interest and significant research is undertaken in how to provide three dimensional viewing perceptions without requiring the user to wear specific glasses or other inconvenient equipment, or requiring the users eyes to remain in a specific location.

Three dimensional (3D) displays add a third dimension to the viewing experience by providing a viewer's two eyes with different views of the scene that is being watched. This can be achieved by having the user wear glasses to separate two views that are displayed. However, as this may be considered inconvenient to the user, it is in many scenarios preferred to use auto-stereoscopic displays that use means at the display (such as lenticular lenses, or barriers) to separate views, and send them in different directions where they individually may reach the user's eyes.

Figure 1:
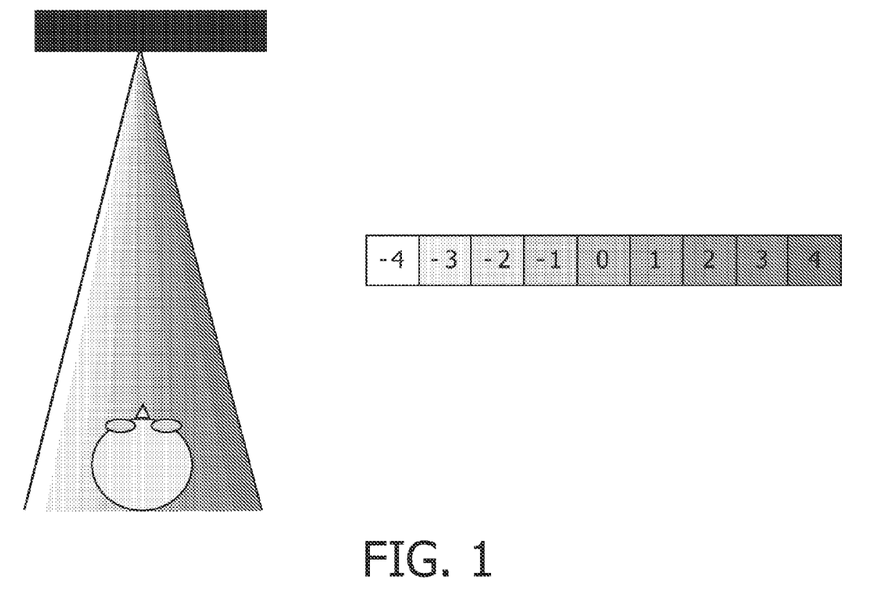
FIG. 1 is an illustration of a three dimensional display system providing a plurality of views in accordance with prior art.

The auto-stereoscopic displays typically produce "cones" of views where each cone contains two or often more views that correspond to different viewing angles of a scene. The viewing angle difference between adjacent views is generated to correspond to the viewing angle difference between a user's right and left eye. Accordingly, a viewer whose eyes see two adjacent views will perceive a three dimensional effect. An example of such a system wherein nine different views are generated in a viewing cone is illustrated in FIG. 1.

However, although the described auto-stereoscopic displays provide a very advantageous three dimensional experience, they also have some associated disadvantages. For example, auto-stereoscopic displays tend to be highly sensitive to the viewers position and therefore tend to be less suitable for dynamic scenarios wherein it cannot be guaranteed that a person is in a very specific location. Specifically, correct three dimensional perception is highly dependent on the user being located such that the user's eyes perceive views that correspond to correct viewing angles. However, in some situations, the user's eyes may not be located optimally for receiving suitable image views, and therefore some auto-stereoscopic displays applications and scenarios, in particularly those where inappropriate views are directed to the eyes of the viewer, may have a tendency to confuse the human visual system leading to an uncomfortable feeling. Such an experience may not be restricted to users in locations wherein incorrect views are received but may even be experienced when a human does not directly look at the display but only sees it as part of his peripheral vision. The experience may be particularly pronounced for embodiments wherein people may move along the display thereby passing through a number of views.

Hence, an improved three dimensional design system would be advantageous and in particular a system allowing increased flexibility, an improved user experience, reduced user discomfort and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided three dimensional display system comprising: a display for presenting a plurality of views of a scene, each view corresponding to a viewing direction for the scene; a rendering unit for generating an image for each of the plurality of views, the rendering unit being capable of generating differentiated images for neighbouring views containing differentiated image data providing a three dimensional depth effect when neighbouring views are viewed by different eyes of a viewer; means for generating a user presence estimate in response to an attempted detection of a user in a viewing area for the display system; and modifying means for modifying the differentiated images for the neighbouring views to adapt the three dimensional effect in response to the user presence estimate.

The invention may provide an improved user experience in many embodiments and scenarios. In particular, an efficient 3D experience may be provided for dedicated users while at the same time reducing the discomfort and inconvenience that may be experienced in some circumstances and scenarios.

For example, the display system may operate in a two dimensional (2D) mode when it is estimated that no users are present and may switch to a three dimensional (3D) mode when it is detected that a user is likely to be viewing the display. This may reduce inconvenience and discomfort that may be introduced to persons who are not located for optimum 3D viewing while at the same time allowing uncompromised 3D performance for users dedicated to the 3D experience.

The user presence estimate may be a binary indication providing an indication of whether any user is detected or not. The viewing area may be any suitable area and indeed may be defined by means for determining the user presences estimate itself. For example, the user presence estimate may be generated on the basis of a camera covering an area and the viewing area may be the area covered by the camera.

The user presence estimate may in some embodiments be indicative of estimated characteristics of the user presence. For example, a position or distance relative to the display may be estimated and reflected in the user presence estimate. As another example, the user presence estimate may be indicative of a mobility characteristic of a user, and specifically may indicate a characteristic reflecting how the user is currently moving. Thus, the provided three dimensional effect may e.g. depend on whether a detected user is moving or not.

Preferably the three dimensional display system according to the present invention is an autostereoscopic display system such as e.g. a lenticular or barrier display system, wherein respectively lenses and shutters are used to direct view information to a user's eyes. More preferably the display provides more than three views simultaneously. In a lenticular autostereoscopic display system the respective views are subsequently directed at particular angles by lenses placed on the display between the display and the observer.

In accordance with an optional feature of the invention, the modifying means is arranged to adjust a depth range for the scene represented by the differentiated images in response to the user presence estimate.

This may allow a particularly attractive user experience and may improve and/or facilitate adjustment and control of the provided 3D experience. The depth range may be a perceptual depth difference between the most foremost and the most backwards image pixels. The depth range may for example be reflected by the differentiated data in terms of occlusion data and/or disparity characteristics between corresponding image areas of the images of neighboring views.

In accordance with an optional feature of the invention, the modifying means is arranged to modify the differentiated image data to vary disparity characteristics for corresponding image areas of the differentiated images in response to the user presence estimate.

This may allow a particularly efficient and high performance means of controlling the 3D effect. For example, the rendering unit may generate disparity values based on depth data for the scene and the generated disparity values may simply be modified depending on the user presence estimate.

For example, the modifying means may be arranged to adjust a disparity offset between corresponding image areas of neighboring views in response to the user presence estimate. Specifically, the modifying means may be arranged to reduce a disparity offset between corresponding image areas of neighboring views when the user presence estimate is indicative of a user being present relative to when the user presence estimate is indicative of a user not being present.

In accordance with an optional feature of the invention, the rendering means is arranged to generate the differentiated image data in response to depth map data for the scene, and the modifying means is arranged to modify a relationship between depth map values and disparity values in response to the user presence estimate.

This may allow a particularly efficient and practical way of controlling the generated 3D effect. In particular, it may reduce complexity, computational resource requirements and/or cost while providing an improved user experience. For example, the depth value of a pixel relative to a screen depth level (or e.g. a most foreground or background level) may be scaled by a scale factor prior to the depth value based rendering. The scale factor may then simply be controlled by the modifying means.

In accordance with an optional feature of the invention, the modifying means is arranged to modify the differentiated image data to vary a viewing angle offset between the differentiated images in response to the user presence estimate.

This may allow a particularly efficient and practical way of controlling the generated 3D effect. In particular, it may reduce complexity, computational resource requirements and/or cost while providing an improved user experience. For example, the rendering may be based on one or more common images with associated depth map data and the rendering unit may be arranged to generate images for the different views based on an input value specifying the viewing angle for the image. The 3D effect may then simply be controlled by modifying the difference in the relative viewing angles used to render the different images that are to be shown in the different views.

In accordance with an optional feature of the invention, the modifying means is arranged to transition the display system from a first mode of operation to a second mode of operation in response to a detection of a new user, the first mode of operation corresponding to a reduced three dimensional effect relative to the second mode of operation.

This may allow an improved user experience and may in particular allow a very efficient 3D experience for a dedicated user without providing inconvenience to other viewers or to the user before the user and/or system is able to provide the optimized experience.

For example, when the user presence estimate is indicative of there being no users in the viewing area, the display system may operate in a 2D mode thereby not causing any inconvenience to passing users or users outside the viewing area. When the system detects that a new user is present, the system may switch to 3D mode to provide the 3D experience to the user.

A new user may be a user who was not previously detected. Thus, the transition may be triggered by the detection of a user who was not detected before. The new user may be the only user in the viewing area. As a specific example, the user presence estimate may provide a binary estimate indicating an estimation of whether there is one or more users present or whether there are no users present. When the estimate changes from indicating that no users are present to indicating that one or more users is present, a transition from a 2D mode to a 3D mode of operation may be instigated.

In accordance with an optional feature of the invention, the modifying means is arranged to control the transition to have a transition time between 0.5 seconds and 10 seconds.

This may provide an improved user experience. Indeed, the user may be provided with a more pleasurable experience wherein a 2D image gradually merges into a 3D image (i.e. the depth perception may slowly emerge). This may provide an improved experience and may also allow the system to adapt to the specific scenario, such as for example to provide an optimization of the views for the specific location of the user.

In accordance with an optional feature of the invention, the modifying means is arranged to transition the display system from a second mode of operation to a first mode of operation in response to a detection of an absence of a user, the first mode of operation corresponding to a reduced three dimensional effect relative to the second mode of operation.

This may allow an improved user experience and may in particular allow a very efficient 3D experience for a dedicated user without providing inconvenience to other viewers or to the user before the user and/or system is able to provide the optimized experience.

For example, when the user presence estimate is indicative of there being a user present, the system may operate in 3D mode to provide the 3D experience to the user. However, when it is detected that the user leaves, the display system may switch to 2D mode thereby not causing any inconvenience to passing viewers.

The absence of a user may be an absence of any user in the viewing area or may in some embodiments correspond to an absence of a user that was previously present. Thus, the transition may be triggered by the failure to detect a user that was detected before. As a specific example, the user presence estimate may provide a binary estimate indicating an estimation of whether there is one or more users present or whether there are no users present. When the estimate changes from indicating that one or more users is present to it indicating that no users is present, a transition from a 3D mode to a 2D mode of operation may be instigated.

In some embodiments, the modifying means may be arranged to control the transition to have a transition time between 0.5 seconds and 10 seconds. This may provide an improved user experience.

In accordance with an optional feature of the invention, the three dimensional display system is further arranged to present a plurality of adjacent groups of views, each group of views comprising at least some of the plurality of views.

This may allow an improved user experience and may in particular allow users in different locations relative to the display to be provided with a high quality 3D experience. The approach may further allow facilitated and/or improved design and manufacturing displays.

In accordance with an optional feature of the invention, the three dimensional display system is arranged to reduce a luminosity of at least a first view relative to a second view of a first group of views, the second view being more central in the first group of views than the first view.

This may allow an improved user experience and may in particular reduce inconvenience and discomfort which may be perceived by some users in some scenarios.

Specifically, although the plurality of views within a single group are ordered to correspond to the image directions corresponding to the right and left eye respectively, this relationship breaks down at the end of a group. In particular, the most rightwards viewing direction will typically be at the end of a group (cone) that is adjacent to a view from the neighboring group which corresponds to the most leftward viewing direction. Accordingly, not only will the 3D image perception be distorted by the increased viewing angle, it will also be corrupted by the viewing directions being inversed/mirrored. This may cause a distorted view and may result in inconvenience and discomfort to the user. This effect may be reduced by reducing luminosity towards the edges of the groups. For example, as a user moves towards the edge of a group/viewing cone, the image may become darker thereby mitigating the perceptual impact of one of the user's eyes moving to the next group/viewing cone. Alternatively or additionally, it may provide the user with feedback that may bias the user away from the group/cone edges.

The luminosity may for example be an average luminosity for the image or a default or background luminosity for the images.

In accordance with an optional feature of the invention, the three dimensional display system is further arranged to not present an image of the scene in at least one edge view of at least one group of views.

This may allow an improved user experience and may in particular reduce inconvenience and discomfort which may be perceived by some users in some scenarios. Specifically, equivalently to the description above, this may mitigate a user receiving inverted 3D cues due to being at the edge between two adjacent groups/viewing cones.

The presentation of no image of the scene may specifically be achieved by providing an image with no detail instead, such as completely white or black image (e.g. corresponding to no luminance). The approach may prevent that a user perceives mirrored/reversed 3D cues as it may not be feasible or even possible for a user in a normal viewing position relative to the display to span more than two views. Alternatively or additionally, it may provide the user with feedback that may bias the user away from the group/cone edges.

In accordance with an optional feature of the invention, the user presence estimate comprises an indication of a relative user position of a detected new user in relation to the display, and the three dimensional display system further comprises means for directing a group of views towards the relative user position.

This may provide an improved user experience and may in particular provide an improved user experience based on the synergistic interaction with the previously described characteristics and options for the invention.

For example, the approach may allow that a user is provided with a 3D effect that is targeted towards his current position relative to the screen. For example, the display may adapt such that when a new user takes a position in front of the display, the output is adapted such that the user is in the center of a group/viewing cone. However, during the time the user is taking up this position as well as during the adaptation time for the system, the user may be presented with a 2D image thereby avoiding the disadvantageous effects of an inappropriately aligned 3D presentation. When the user has stabilized his position and the system has adapted the viewing cone to the stabilized position, the three dimensional characteristics may gradually be turned up to provided the full 3D experience.

In accordance with an optional feature of the invention, the user presence estimate comprises a user attention estimate indicative of a user attention to the display.

This may allow improved operation and may in particular allow an improved adaptation of the system to the specific user environment and characteristics.

According to an aspect of the invention there is provided a method of operation for a three dimensional display system comprising: presenting a plurality of views of a scene on a display, each view corresponding to a viewing direction for the scene; generating an image for each of the plurality of views, including generating differentiated images for neighbouring views containing differentiated image data providing a three dimensional depth effect when neighbouring views are viewed by different eyes of a viewer; generating a user presence estimate in response to an attempted detection of a user in a viewing area for the display system; and modifying the differentiated images for the neighbouring views to adapt the three dimensional effect in response to the user presence estimate.

According to an aspect of the invention there is provided a computer program product for executing the method described above.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 2:
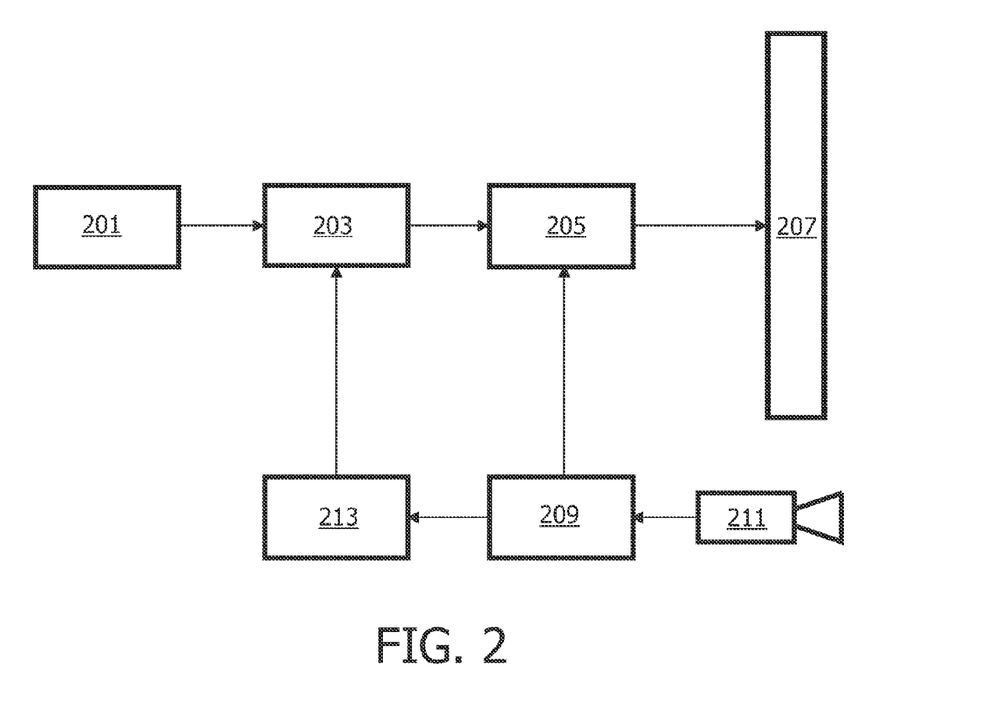
FIG. 2 illustrates an example of a three dimensional display system in accordance with some embodiments of the invention.

FIG. 2 illustrates an example of a three dimensional display system in accordance with some embodiments of the invention. The three dimensional display system is arranged to generate a plurality of views which correspond to different viewing angles of the same scene such that a user seeing different views in the two eyes may perceive a three dimensional image.

In the example, the three dimensional display system comprises an image data source 201 which provides image data and associated data that may allow generation of images for a three dimensional perception. In the specific example, the provided data is provided by a plurality of image layers corresponding to a background layer and one or more foreground layers for the background image. In addition, the provided data comprises a depth map for each image layer which contains a depth value for each pixel of the image layer.

For clarity and brevity, the following description will focus on the processing of a single image such as a still image.

However, it will be appreciated that the described principles apply equally to e.g. representations of three dimensional animations and moving images. For example, the described processing may be applied individually to each image and depth map of a three dimensional video signal, when a layered depth model is used as the three dimensional video signal.

The image data source 201 is coupled to a rendering processor 203 which is arranged to render a plurality of images for different views of the scene represented by the image data received from the image data source 201. The images are rendered to correspond to images that are perceived by the right or left eye of a viewer respectively.

In particular, the rendering processor 203 may generate a range of images where each image corresponds to a view of one eye with the adjacent view corresponding to the view of the other eye. The images are generated such that when two adjacent views are perceived by respectively the left and right eye of a user, a desired 3D effect is perceived by the user.

For example, when operating in full 3D mode, the rendering processor 203 may generate an image for the central view which corresponds to the image that will be seen by an eye directly in front of the scene. The image is generated on the basis of the received image layers and the depth map. The image for the view directly to the right may then be generated to correspond to the view that will be seen from a viewing angle offset to the right by an amount corresponding to the typical difference in the viewing angles between the left and right eyes at the desired distance. The image for the view to the right of this view is generated by repeating this process, i.e. by generating an image that corresponds to a viewing angle further offset to the right by an amount corresponding to the typical difference in the viewing angles between the left and right eyes at the desired distance. The same approach will be used for images corresponding to the view to the left of the central view (with the viewing angle offset between two images being in the opposite direction). Thus, a user located such that the left and right eyes receive images from adjacent views will receive differentiated images containing differentiated image data which reflects the different viewing angles. Accordingly, the user may perceive a three dimensional depth effect. In the specific example, the rendering processor 203 generates nine images for nine adjacent views (similar to the example of FIG. 1).

As will be explained in the following, the rendering processor 203 may not always operate in the 3D mode but may operate in reduced 3D mode including a 2D mode in which all generated images are identical, i.e. wherein the same image is used for all views.

It will be appreciated that any suitable algorithm for generating an image for a given viewing angle from a three dimensional model or video signal may be used without detracting from the invention. For example, algorithms for rendering views for multi-view displays based on a three dimensional model, such as a three-dimensional layered depth model, are well known to those skilled in the art. An example of a suitable algorithm for rendering of views based on a layered depth model may be found in "Layered Depth Images", by Shade, J., et. al, published at SIGGRAPH98. Other sources for algorithms for rendering views can be found in Computer Graphics textbooks.

The generated images are fed to a group controller 205 which generates a plurality of adjacent groups of views. The group controller 205 is arranged to generate the plurality of groups of views such that each group comprises the same views. The group controller 205 is coupled to a 3D display which is arranged to present the groups of views. Each group of views may thus correspond to a viewing cone such as that illustrated in FIG. 1.

Thus, in the example, the 3D display does not only display non-overlapping views but rather display a group of views which is duplicated or replicated across the display. Specifically, each group of views may be presented in a viewing cone similar to that illustrated in FIG. 1 but the viewing cones are duplicated across the display. Thus, the leftmost view of one group of views will be adjacent to the rightmost view of the adjacent group of views (which is identical to the rightmost view of the group of views itself). Similarly, the rightmost view of one group of views will be adjacent to the leftmost view of the adjacent group of views (which is identical to the leftmost view of the group of views itself).

Thus, in the example, a fundamental set of views is repeated across the display thereby allowing e.g. users at different locations relative to the display to perceive an efficient 3D perception. Thus as illustrated in FIG. 3, the viewing cones may repeat periodically across the display so that persons in different cones can view the same content.

The group controller 205 assigns the rendered images corresponding to the different viewing angles to the appropriate views in the groups. Specifically, the image corresponding to the leftmost viewing angle is allocated to the leftmost view of each group/cone, the image corresponding to the next leftmost viewing angle is allocated to the next leftmost view of each group/cone, etc.

However, in addition the system of FIG. 1 is arranged to adapt the behaviour in response to estimations of the presence of one or more users in order to reduce inconvenience and discomfort to viewers in suboptimal positions.

Figure 3:
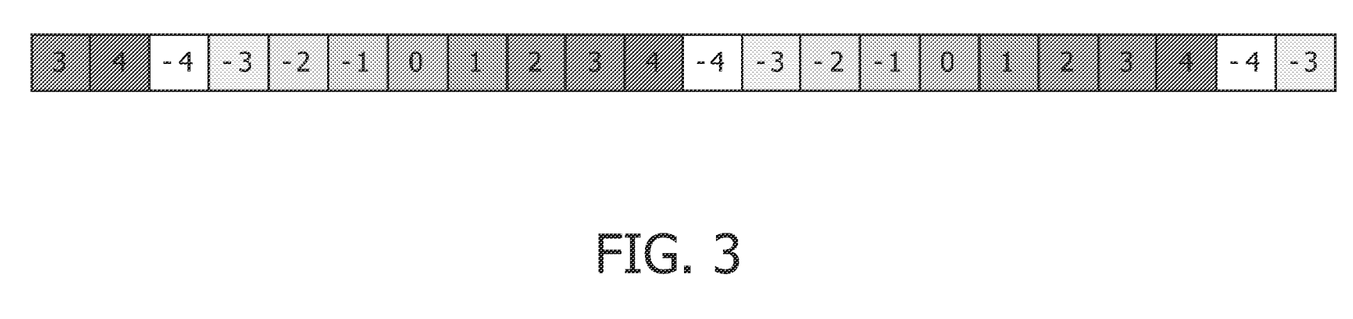
FIG. 3 is an illustration of a plurality of views generated by a three dimensional display system.

Specifically, if a viewer is positioned at a cone boundary such that he is viewing views from different groups he will see left-right inverted views which may confuse the human visual system and thus may lead to an uncomfortable feeling (e.g. the left eye may see a +4 image of FIG. 3 and the right eye may see a −4 image). These group/cone boundary transitions provides one of the main disadvantages with most autostereoscopic 3D displays. Indeed, even when a human is not directly looking at the display but is only viewing it as part of his peripheral vision, discomfort may be induced close to cone boundaries. This may be particularly critical when people move along the display as this will result in them passing through several cone boundaries.

In the system of FIG. 2, the operation is adapted in response to a generated estimate of a user presence in a suitable area. The user estimate may specifically be used to adapt the viewing cone such that when a new user is detected the group controller 205 generates the groups of views such that the viewing group/cones will tend to be generated with the user in the centre of the viewing cone.

However, although an adaptation of the viewing cone/group to the position of a user may substantially improve the user experience and reduce inconvenience and discomfort, the user may initially be located on the borders between viewing groups. For example, during the time interval from when a user typically starts to view the screen until he is located at his desired position, the user may experience distorted or mirrored 3D cues resulting in discomfort. Also, adaptation of an initial viewing cone will not mitigate the problem of incidental viewers, such as e.g. viewers moving across the display.

In the system of FIG. 2, this is mitigated by the user presence estimate also being used to control the 3D effect provided by the images of the different views.

As a specific example, a user presence estimate may be used to switch the display system between a 2D mode of operation and a 3D mode of operation. For example, if the user presence estimate indicates that no user has been detected for a given time interval, the display system may operate in a 2D mode of operation. This may for example be achieved by displaying the same content in all views, i.e. by presenting the same rendered image in all views of all groups of views. In this case, incidental viewers or users in the process of taking a position for viewing the display will not experience any distortions or discomfort but will merely experience a two dimensional scene. However, when a user is detected the display system can slowly transition from the 2D to a 3D mode of operation e.g. by gradually increasing the depth effect over e.g. two seconds. This will give the impression to the user that the objects slowly turn from 2D to 3D. Furthermore, before the transition to the 3D mode, a viewing group or cone can be aimed at the user or placed in a way that is optimal with respect to multiple user positions.

When multiple users are detected, the adaptation of the viewing group or cone may be achieved by aiming the cones/groups of views such that a minimum number of users are hit by a cone boundary or by maximizing the average distance from centres of the detected faces to their nearest cone boundaries. For example, if two users are detected, the average or sum distance between the centre of each detected face and the nearest cone boundary may be evaluated for e.g. all possible alignments of the cones (e.g. for the nine different possibilities for a display providing nine views per cone). The alignment that provides the maximum combined distance to the cone boundaries may then be selected. The same approach may for example be used to minimize the combined distance from the centre of the cones to the centre of the face. Alternatively, for each alignment it may be determined whether any of the detected face locations are too close to a cone boundary. An alignment may then be selected for which there are no detected face locations within a given cone boundary interval. If no such alignment is possible, an alignment may be selected which results in only one face being in a cone boundary interval. If this is not possible, an alignment with only two faces in cone boundary intervals may be selected etc.

It will be appreciated that depending on the number and location of users, it may not always be possible to adapt the viewing cones/groups so that no users will be at a boundary between viewing cones. In some embodiments, this may be considered acceptable (e.g. users located within the boundaries may typically move if they do not perceive an acceptable 3D image). However, in other embodiments, the 3D effect may be adjusted in response to a detection of a user in a boundary interval for a group of views. For example, the apparatus may remain in the 2D mode of operation until it is detected that an alignment of the viewing groups/cones is possible without any users being located in a viewing cone boundary interval.

If no user is detected for a given interval, the display may slowly transition back to the 2D mode of operation. Experiments have been conducted which have been demonstrated that the result is perceived to be much more pleasant than using a fixed depth effect and static cone boundaries. In particular the transition between 2D and 3D and back was not perceived as unpleasant.

Thus, the display system of FIG. 2 comprises a user processor 209 which is arranged to generate a user presence estimate which specifically may be a binary value that indicates whether a user is estimated to be present or not.

In the example, the user processor 209 is coupled to a camera which is arranged to capture an area in front of the display 207. The camera 211 may for example be located above or below the display. The signal from the camera 211 is fed to the user processor 209 which proceeds to evaluate the signal to detect the presence of a user. In the specific example, the user processor 209 performs face detection on the received video signal. Thus, the face detection algorithm seeks to detect a presence of a user by attempting to detect a face in the received signal. If a face is detected, the user presence estimate is set to indicate that a user is present and otherwise it is set to indicate that a user is not present. The face detection algorithm may specifically be arranged to detect faces that are turned towards the camera 211 and the display 207 as this may provide an indication of not only a viewer being present but may also indicate that the viewer is likely to be a user of the display, i.e. that the detected face is aimed at the display in order to view the displayed image(s). Thus, the approach may provide an advantageous differentiation between users and incidental viewers and may thus not only provide a presence indication but also an attention indication.

It will be appreciated that the user presence detection may be subject to various requirements being met. For example, for the user presence indication to indicate that a user is present, it may be required that the user has been detected in at least a given time interval. Similarly, for the user presence indication to indicate that a user is absent, it may be required that no user has been detected in at least a given time interval.

It will be appreciated that different algorithms for face detection are known to those skilled in the art. It will also be appreciated that other algorithms for determining a user presence estimate may alternatively or additionally be used in other embodiments.

In the example, the user processor 209 generates a user presence estimate which may not only indicate whether a user is present or not but which may also provide an estimate of the position of the user relative to the display. For example, the location of a face in the image captured by the camera 211 may be used to estimate the position of the user along the display 207. This location information is in the specific example fed to the group controller 205 which uses it to generate a viewing group/cone which corresponds to the estimated position along display. For example, the views may be allocated to specific display view beams such that the beam that corresponds to the user's position is allocated the central view of an image group (e.g. view 0 of the example of FIG. 3).

For example, the display 207 may specifically have nine views per cone/group and a total of eight cones/groups. The total number of views is accordingly 72. The face detection algorithm may detect a person positioned in, say, view 37. Because of the physics of the lenticula of the display, the views repeat themselves every nine views, i.e. view i is the same a view i+9 for all i. The rendering computes 9 different views, −4 to 4 with view 0 being the original 2D image. The rendered centre view is assigned to one of the 72 views. There are only nine different configurations to assign the centre view. The other rendered views are placed around the centre views as exemplified in FIG. 3. In order to optimize for the viewer at position 37, the group controller 205 accordingly assigns the centre view to position 37.

In this example, it is assumed that the viewer is at the optimal viewing distance. Adapting the display to a specific viewer distance may be more complicated. E.g. assuming that the viewer is at a distance of, say, 4 m, it is determined which pixels are visible from position 37 and at the distance of 4 m and the centre view is placed in this pixel subset. Rendered view 1 is then placed in the pixel subset visible from position 38 and at the distance of 4 m. Rendered view −1 is placed in the pixel subset visible from position 36 and at the distance of 4 m and so on.

It will be appreciated that distance and position estimates may be obtained using face detection. Specifically, face detection algorithms are known which provide a rectangle representing a detected face. The center of the rectangle can be used as the position of the face. The exact eye positions are not generally required for the specific system. Furthermore, for cone/viewing group aiming, only the horizontal position is required (neither distance nor vertical position are needed). The size of the rectangle may be used to estimate the distance to the person. The distance is e.g. useful for ignoring people that are far away while at the same time allowing these to be tracked until they get closer. Typically only rectangles above some minimal size (e.g. 20×20 pixels) are generated thereby often limiting the distance range. Therefore a suitable field of view is required for the individual embodiment and scenario with a narrow field of view resulting in a long distance range and a wide field of view resulting in a short distance range. A higher resolution camera allows a larger distance range. VGA cameras (640×480) are sufficient for most scenarios.

It will also be appreciated that various camera improvements can be used to improve the accuracy and reliability of the face detection algorithm. For example, the camera 211 may be a stereo camera, an Infrared camera, a high dynamic range camera and/or a depth camera (specifically based on time of flight of light).

It will also be appreciated that in other embodiments, other methods and principles for detecting a user presence estimate may be used. For example, a simple Infrared heat sensor (e.g. a Passive Infrared Detector, PID) may be used to provide a simple binary estimate of whether or not a person is present within the area covered by the sensor.

The display system furthermore comprises a 3D controller 213 which is coupled to the user processor 209 and the rendering processor 203. The 3D controller 213 receives the user presence estimate from the user processor 209 and based on this estimate it proceeds to control the 3D effect provided by the images generated by the rendering processor 203.

In the example, the 3D controller 213 controls the degree of 3D perception provided by the images. Thus, the difference in the image data for the different images rendered by the rendering processor 203 is adapted to provide a desired 3D effect. Specifically, the depth range for the scene may be adapted by the 3D controller 213 dependent on the user estimate. Thus, the difference between the depth for the pixel elements perceived to be respectively furthest away from and closest to the viewer may be adapted depending on the user presence estimate. In the example, the depth range may be at the full level represented by the scene data from the image data source 201 when the display system is operating in the normal 3D mode of operation (i.e. when a user has been present for more than a given amount of time), but may contain no depth range when the system is operating in a 2D mode of operation (i.e. when a user has been present for more than a given amount of time).

Furthermore, in the example, the 3D controller 213 may control the transition between the 2D mode of operation and the 3D mode of operation to be very gradual. Indeed, when a user is detected (e.g. a face has been detected for longer than a given interval), the 3D controller 213 gradually controls the rendering processor to generate images that change from corresponding to a flat image (same image in all views) to one that corresponds to a full 3D view (i.e. with differentiated image data that corresponds to different viewing angles for a right and left eye).

Similarly, when it is detected that a user has been absent for more than a given time interval (e.g. a face that was previously detected is no longer detected or indeed that no face has been detected for a given interval), the 3D controller 213 gradually controls the rendering processor to generate images that change from corresponding to a full 3D view (i.e. with differentiated image data that corresponds to different viewing angles for a right and left eye) to one that corresponds to a flat image (same image in all views).

In the example, the 3D controller 213 controls the rendering processor 203 such that the transitions are relatively slow. A particular attractive user experience has been found for one or both transitions having a transition time of between 0.5 and 10 seconds, and in particular between 1 and 5 seconds. This approach may provide a user with an experience that when he sits down in front of a display, the presented image will automatically and gradually become three dimensional. Furthermore, the image will automatically revert to a 2D image when the user leaves thereby reducing inconvenience and discomfort to others.

In the example, the 3D perception cues are provided by the different images having differentiated image data relative to each other, i.e. when a 3D effect is provided the images are not identical. The differentiated image data may specifically comprise in a shifting of image areas corresponding to a disparity value that represents the parallax effect (between the left and right eye) for the specific depth of the image area. For example, the disparity values will increase the further an image object is towards the user and thus the offset of image areas between the images for neighbouring views will increase the further forward these image areas are. Indeed, the disparity values and offsets will tend to be zero for many background image areas. In addition, the differential image data may e.g. contain occlusion data. For example, a background image area may in one image be occluded by a foreground image object but may in another image be visible. Thus, the corresponding pixel values may in one image correspond to the foreground image object and may in the neighbouring image correspond to the background image.

It will be appreciated that in different embodiments, different approaches may be used for modifying the 3D effect depending on the user presence estimate. For example, in some embodiments, the user presence estimate may be considered in detail as part of the rendering algorithm. However, in other embodiments, the 3D controller 213 may control the operation of the rendering processor by one or more parameters.

For example, the modification of the 3D effect may be achieved by modifying the differentiated image data such that a viewing angle offset between the differentiated images is varied in response to the user presence estimate. Thus, when in the 2D mode of operation, the viewing angle for all images may be identical and indeed there may be no differentiated image data. However, when operating in the 3D mode of operation the differentiated image data may reflect the impact of different viewing angles for the different images corresponding to a viewing angle offset between a human's eyes.

In some embodiments, the 3D controller 213 may specifically provide the rendering processor 203 with a viewing angle offset between neighbouring views. The rendering processor may then use this image viewing offset to create images that are differentiated such that they correspond to the image viewing offset. Thus, occlusion and disparity processing will be performed such that the generated images represent images of the scene with the prescribed viewing angle offset. The 3D controller 213 may then simply transition the display system from 2D to 3D by gradually increasing the viewing angle offset from zero to a value corresponding to the full viewing angle offset for the left and right eye. The transition from the 3D mode to the 2D mode may be achieved by reducing the viewing angle offset from the full value to zero.

Thus, in the system the disparity characteristics for the differentiated image data between neighbouring images will be changed dependent on the user presence estimate. The disparity values that are used to generate the image data may often be generated as a function of the depth level of the image area as defined by the depth map. Thus, a pixel that is part of an image object which is far in the background will have a low disparity (and specifically may have no disparity) as it is seen at roughly the same angle by both eyes. However, a pixel of an image object close to the user will have a high disparity. The rendering algorithm typically determines the disparity as a function of the depth and in the system of FIG. 2, the 3D controller 213 may be arranged to modify this function dependent on the user presence estimate. For example, the disparity for a given value of a depth of a pixel may be varied in response to the user presence estimate. As a specific example, the depth value from the depth map comprising the pixel may be modified before it is translated into a disparity value. As a simple example, the disparity value may be determined as:

$$dis = f(c \cdot d)$$

where f(x) is a standard translation of a depth to a disparity value, d is the depth for the pixel and c is a scaling factor which is controlled by the 3D controller 213. Thus, when no user is estimated to be present, the 3D controller 213 may set the scaling factor to zero resulting in a 2D display output being generated, and when a user is detected, the scaling factor may be slowly increased to one resulting in the gradual emergence of the 3D depth effect.

It will be appreciated that in some embodiments, the user presence estimate may not only indicate whether a user is estimated to be present but may also comprise an indication of whether the user is estimated to be focusing actively on the screen. For example, an estimate of the user attention to the display may be estimated by determining the duration in which the face detection algorithm detects a face turned towards the screen. Thus, if the algorithm detects a face turned towards the screen for a long time interval, it is likely that the user is actively viewing the display and accordingly a strong 3D effect is provided. However, if the face detection only detects a face in relatively short intervals, it is likely that this is because the user keeps turning his head away from the display and thus is not actively watching the display and is therefore more likely to be discomforted by cone edges. Accordingly, the 3D effect may be reduced.

In some embodiments, the user presence estimate may include an indication of a mobility characteristic for a user. For example, the face detection algorithm may detect the movement of a detected face and the user presence estimate may indicate a property of this movement, such as how fast the face is moving or if the movement is in a continuous direction (e.g. corresponding to a viewer walking past the display). The provided 3D effect may then be modified depending on the mobility characteristic. For example, the apparatus may only transition from the 2D mode of operation to the 3D mode of operation if a user is detected who is not moving. Thus, for a fast moving viewer, such as a viewer walking past the display, no differentiated 3D views are provided thereby reducing discomfort.

In some embodiments, the display apparatus may further be arranged to change a characteristic of the images depending on which view of a group of views that the image is presented in.

For example, the group controller 205 may be arranged to reduce a luminosity of at least one view towards the edge of a cone/group relative to the luminosity of a more central view of the cone/group. Thus, towards the edges of the cones, the images may become darker thereby reducing the impact of cross cone/group views and providing feedback to the user that he is nearing an area where the 3D effect is degraded.

Specifically, the group controller 205 may be arranged to not present an image of the scene in at least one edge view of the groups. For example, an entirely white or black image may be presented instead thereby ensuring the user is not receiving mirrored 3D cues and providing a feedback to the user. E.g. in FIG. 3 all views corresponding to −4 and +4 may be uniform black images thereby providing feedback and preventing the mirroring effect. It will be appreciated that in many embodiments the overlap risk may be mitigated by only modifying one view of each group. E.g. darkening all images corresponding to view +4 of FIG. 3 will ensure that no two adjacent views present mirror imaged 3D cues.

As a specific example, the display system may proceed to darken views near the cone/group edges. The degree of darkening may be gradually increased towards the cone/group edge until the view directly at the cone/group edge is completely black. This will have the effect that a viewer at the cone/group boundary will see a black display which does not result in the discomfort often associated with inverted views and 3D cues. This approach also provides feedback to the user when the user is in a suboptimal position. Indeed, it will tend to subconsciously bias the user away from the edges. The trade-of is that some views will not be available for the 3D presentation but this is likely to be increasingly less of a disadvantage as displays increasingly tend to be able to provide a large number of views per group/cone (and this number is expected to increase). The approach may in particular be advantageous for a multi-user scenario.

In the specific example, the rendering processor 203, the group controller 205, the user processor 209 and the 3D controller 213 are implemented as firmware running on a computational device such as a processor or a computing platform, which is part of the display system. The computing platform may for example be a digital signal processor which performs the method of FIG. 4.

Figure 4:
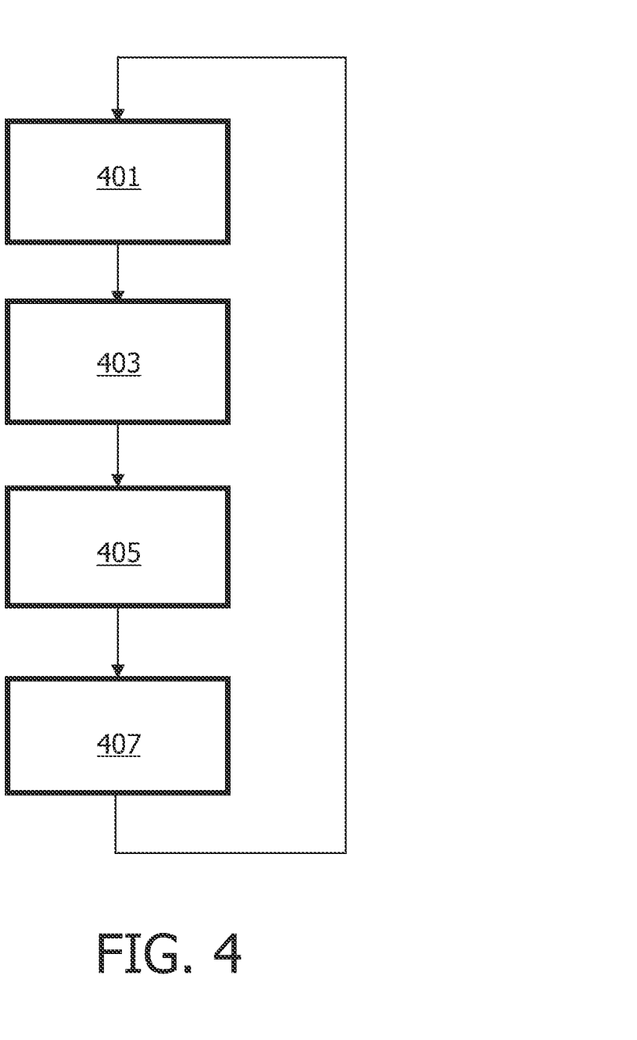
FIG. 4 illustrates an example of a method of operation for a three dimensional display system in accordance with some embodiments of the invention.

In step 401 an image for each of a plurality of views is generated. This includes sometimes generating differentiated images for neighbouring views containing differentiated image data providing a three dimensional depth effect when the neighbouring views are viewed by different eyes of a viewer.

Step 401 is followed by step 403 wherein a user presence estimate is generated in response to an attempted detection of a user in a viewing area for the display system.

Step 403 is followed by step 405 wherein a three dimensional effect provided by the images of the plurality of views is modified in response to the user presence estimate.

Step 405 is followed by step 407 wherein the plurality of views is presented on a display with each view corresponding to a viewing direction for the scene.

The method may then return to step 401.

It will be appreciated that whereas the above description has focused on an application wherein a still image is presented, the approach is equally applicable to e.g. moving images. For example, each iteration of the method of FIG. 4 may process the same still image or may process a new image in a sequence of moving images. For example, each iteration may process a new frame of a video signal.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A three dimensional display system comprising:
a display presenting a plurality of views of a scene, each view corresponding to a viewing direction for the scene;
a rendering unit generating a respective image for each of the plurality of views, the rendering unit being capable of generating differentiated images for neighboring views containing differentiated image data providing a three dimensional depth effect when neighboring views are viewed by different eyes of a viewer;
a user processor generating a user presence estimate in response to an attempted detection of a user in a viewing area for the display system, the presence estimate including an orientation of the user; and
a data processor:
receiving the user presence estimate; and
modifying the differentiated images for the neighboring views to adapt the three dimensional effect in response to the determined orientation of the user, wherein the differentiated images are gradually transitioned over a known time from a first mode of three dimensional effect to a second mode of three dimensional effect in response to a detection of a change in the user presence estimate, the first mode of three dimensional effect corresponding to a reduced three dimensional effect relative to the second mode of three dimensional effect.

2. The three dimensional display system of claim 1, the data processor:
adjusting a depth range for the scene represented by the differentiated images in response to the user presence estimate.

3. The three dimensional display system of claim 1, the data processor:
modifying the differentiated image data to vary disparity characteristics for corresponding image areas of the differentiated images in response to the user presence estimate.

4. The three dimensional display system of claim 3, the rendering unit:
generating the differentiated image data in response to depth map data for the scene, and
the data processor:
modifying a relationship between depth map values and disparity values in response to the user presence estimate.

5. The three dimensional display system of claim 1, the data processor:
modifying the differentiated image data to vary a viewing angle offset between the differentiated images in response to the user presence estimate.

6. The three dimensional display system of claim 1, the data processor:
controlling a transition of said first mode of three dimensional effect to said second mode of three dimensional effect to be between 0.5 seconds and 10 seconds.

7. The three dimensional display system of claim 1, the data processor:
controlling transition from the second mode of three dimensional effect to the first mode of operation in response to a determination of an absence of a user.

8. The three dimensional display system of claim 1, the data processor:
presenting a plurality of adjacent groups of views, each group of views comprising at least some of the plurality of views.

9. The three dimensional display system of claim 8, the data processor:
reducing a luminosity of at least a first view relative to a second view of a first group of views, the second view being more central in the first group of views than the first view.

10. The three dimensional display system of claim 8, the data processor:
presenting an image of the scene in at least one edge view of at least one group of views.

11. The three dimensional display system of claim 8, wherein the user presence estimate comprises an indication of a relative user position of a detected new user in relation to the display, and the data processor:

directing a group of views towards the relative user position.

12. The three dimensional display system of claim 1, wherein the user presence estimate comprises:

a user attention estimate indicative of a user attention to the display.

13. A method of operating a display system, the display system comprising:

presenting a plurality of views of a scene on a display, each view corresponding to a viewing direction for the scene;
　　a rendering unit generating a respective image for each of the plurality of views, each view corresponding to a viewing direction for the scene, including generating differentiated images for neighboring views containing differentiated image data providing a three dimensional depth effect when neighboring views are viewed by different eyes of a viewer; and
　　a user processor generating a user presence estimate in response to a detection of a user in a viewing area for the display system, the user presence estimate including an orientation of the user; and
　　a data processor:
　　　　receiving the user presence estimate; and
　　　　transitioning the differentiated images for the neighboring views to adapt the three dimensional effect in response to the orientation of the user wherein the differentiated images are gradually transitioned over a known time from a first mode of three dimensional effect to a second mode of three dimensional effect in response to a detection of a change in a user presence, the first mode of three dimensional effect corresponding to a reduced three dimensional effect relative to the second mode of three dimensional effect.

14. A computer program product, stored on a medium that is not a transitory propagating signal or wave, said product providing to a data processor instruction for:

presenting a plurality of views of a scene on a display, each view corresponding to a viewing direction for the scene;
　　generating, in a rendering unit a respective, image for each of the plurality of views, including generating differentiated images for neighboring views containing differentiated image data providing a three dimensional depth effect when neighboring views are viewed by different eyes of a viewer;
　　generating, in a user processor, a user presence estimate in response to a detection of a user in a viewing area for the display system, the user presence estimate including an orientation of the user; and
　　receiving in a data processor a user presence estimate in response to a detection of a user in a viewing area for the display system, the user presence estimate including an orientation of the user; and
　　the data processor transitioning the differentiated images for the neighboring views to adapt the three dimensional effect in response to the orientation of the user wherein the differentiated images are gradually transitioned over a known time from a first mode of three dimensional effect to a second mode of three dimensional effect in response to a detection of a change in a user presence, the first mode of three dimensional effect corresponding to a reduced three dimensional effect relative to the second mode of three dimensional effect.

15. The system of claim 1, wherein the orientation of the user comprises a direction of view of the user.

16. The system of claim 1, wherein the direction of view of the user is determined based on a recognition of a facial characteristic of the user.

17. The system of claim 1, wherein the user presence estimate comprises a range of the user.

18. The method of claim 13, comprising a display presenting the plurality of views of a scene.

* * * * *